United States Patent [19]

Stewart

[11] Patent Number: 4,992,750

[45] Date of Patent: Feb. 12, 1991

[54] COUPLING MECHANISM FOR EFFICIENT CONVERSION OF AXISYMMETRIC BEAM PROFILES INTO PROFILES SUITABLE FOR DIFFRACTION

[76] Inventor: B. W. Stewart, 5745 Pandora Ave., Cincinnati, Ohio 45213

[21] Appl. No.: 380,890

[22] Filed: Jul. 18, 1989

[51] Int. Cl.$^5$ .................. H01S 3/23; G21K 1/06; G02C 5/18

[52] U.S. Cl. .................. 330/4.3; 350/355; 372/21; 372/33

[58] Field of Search .................. 330/4.3; 332/7.51; 350/353, 355; 372/21, 33

[56] References Cited

U.S. PATENT DOCUMENTS

| | | | |
|---|---|---|---|
| 4,050,036 | 9/1977 | Chambers et al. | 372/99 |
| 4,145,671 | 3/1979 | Hellwarth | 332/7.51 |
| 4,794,344 | 12/1988 | Solinson | 330/4.3 |
| 4,803,686 | 2/1989 | Brock | 330/4.3 |
| 4,852,973 | 8/1989 | Durnin | 372/103 |
| 4,865,042 | 9/1989 | Umemura et al. | 128/660.03 |
| 4,879,532 | 11/1989 | Shemwell et al. | 330/4.3 |
| 4,887,885 | 12/1989 | Durnin et al. | 350/162.11 |

OTHER PUBLICATIONS

Durnin, J., Micheli, J. J., Jr., and Eberly, J. H., Phys. Rev. Lett, "Diffraction-Free Beams", vol. 58, No. 15, 1499-1501, (Apr. 13, 1987).

Ibeo Tschudi, Andreas Herden, Joachim Goltz, Harald Klumb, Franco Laeri and Johan Albers, "Image Amplification by Two- and Four-Wave Mixing in BaTiO$_3$ Photorefractive Crystals", *Journal of Quantum Electronics*, vol. QE 22, No. 8, Aug. 1986.

He Hailin, "Formation and Applications of Ring Profile Laser Beams", Chinese Physics-Lasers, vol. 13, No. 10, Oct. 1986.

Hsiung Husu, "Large Signal Theory of Phase-Conjugate Back-Scatterings", *Applied Physics Letters*, vol. 34(12), Jun. 15, 1979.

Primary Examiner—Nelson Moskowitz
Attorney, Agent, or Firm—Wood, Herron & Evans

[57] ABSTRACT

Novel designs for an efficient coupling mechanism for the conversion of typical profile laser beams into Jo profile beams are presented. Five specific embodiments are provided which employ non-linear optical mechanisms in the conversion process.

6 Claims, 4 Drawing Sheets

COUPLING MECHANISM FOR EFFICIENT CONVERSION OF AXISYMMETRIC BEAM PROFILES INTO PROFILES SUITABLE FOR DIFFRACTION

BACKGROUND OF THE INTRODUCTION

Recently, Durnin, Miceli, and Eberly (Ref. 1) of the University of Rochester have demonstrated, both theoretically and experimentally, the existence of diffraction-free modes in free space laser beam propagation. By passing an ordinary, Gaussian profile laser beam through a thin annular slit and collimating the result, the workers generated a beam with a Jo-type profile. ('Jo' refers to the Bessel function of the zeroth order.) The advantage of the Jo profile over the Gaussian profile is that the former does not suffer geometric divergence (herein referred to as diffraction) as it propagates in free space, with no boundaries nor guiding surfaces present. Of course, plane waves also share this property. However, the Jo profile has the advantage that the beam's intensity is greatest at the center, an important feature for laser welding, laser weaponry, and laser-induced charged-particle and neutral-particle beam guidance.

Unfortunately, in the process of "reforming" the beam's profile, much of the energy is lost in absorption by the mask containing the annular slit itself. This reality severely limits the usefulness of the technique for high power applications. Additionally, although the beam does not undergo diffractive spreading, the radius of the collimating lens determines an effective maximum range.

However, this range was shown, in Ref. 1, to usually be much greater than that of the ordinary, collimated Gaussian beam. These researchers also experimentally demonstrated that the Jo-profiled beam had a greatly increased propagation range as compared to the associated Gaussian-profiled beam.

The practical difficulty with employment of this Gaussian-to-Jo coupling mechanism to problems, for instance, related to high energy, long distance laser beam transmission lies in the fact that about 99% of the laser beam's energy is absorbed by the mask: only a fraction is transmitted through the annular slit.

The system(s) detailed below all incorporate non-linear optical mechanisms. Stimulated Brillouin scattering (SBS) and two-wave mixing are described in some detail by Zel'dovich, et al (Ref. 2). Degenerate four-wave mixing (dfwm) is described in U.S. Pat. No. 4,145,671 to Hellwarth as well as Ref. 2. Both SBS and dfwm are often referred to as optical phase conjugation (opc) processes.

SUMMARY OF THE INVENTION

The system(s) described herein allows much greater efficiency in the Gaussian-to-Jo coupling process. In fact, any collimated beam with an axisymmetric intensity profile can efficiently be converted into a Jo profile. The present invention, in its various embodiments, utilizes non-linear optical processes in order to achieve its higher conversion efficiency. The present invention can have a variety of applications: precision laser alignment systems, precision laser welding systems, long-distance laser communication and power transmission systems, and charged and neutral-particle beam channeling or optical systems. The use of Jo -profiled beams provides advantages over Gaussian beams in extracting energy efficiently from laser gain media, while maintaining low beam divergence, due to the superior diffraction and volume "fill-in" characteristics of the Jo -profiled beam. It can find utility in any application in which any combination of high central intensity, rapid intensity decrease in the transverse direction, or long propagation distances are desired.

A design for the coupling mechanism is indicated in FIG. 1. In the figure a single laser is used. A low intensity portion of the beam is diverted and used to illuminate the mask containing the annular slit. Only about 1% of this beam's intensity will be transmitted through the mask in the optimum geometry. This light is then directed into the four-wave mixing medium. The four-wave mixing medium is pumped by the same laser. The dfwm mechanism will phase conjugate and amplify the Jo profile beam component. The result is a more efficient coupling of the laser's energy into the Jo profile. Theoretical calculations (Ref. 3) indicate that 50% of the pump beam's laser energy can be coupled this way. Experimentally, gains as high as 1000 have been achieved (Ref. 4). A gain of 100 in the present case leads to a prediction of 33% coupling efficiency. Therefore, we expect between 33%–50% efficiency in the coupling mechanism depending upon the geometry employed. This, of course, represents a significant improvement over the 1% coupling one would expect without using the device. This improvement should make this Jo coupling approach clearly preferable to the standard transmission of Gaussian profile laser beams in some instances.

Non-Gaussian profiles of collimated beams can be converted into Jo-profiles as well. In fact, by use of a "donut-mode" profile roughly twice as much energy can be coupled to the Jo-form. Also, since most lasers could be designed with higher outputs if the TEMoo restrictions were lifted, this approach could be multiply beneficial. As a further example, a device which converts a beam with a Gaussian profile (or any other axisymmetric profile) into a ring-profiled beam has been recently described by Hailin (Ref. 5). This ring profiler could be employed to significantly increase the percentage of incident light transmitted through the annular slit.

BRIEF DESCRIPTION OF THE DRAWINGS

The following and other objects and features of the invention may be readily understood with reference to the following detailed description taken in conjunction with the accompanying drawings, in which.

DETAILED DESCRIPTION OF THE INVENTION

Figure 3:
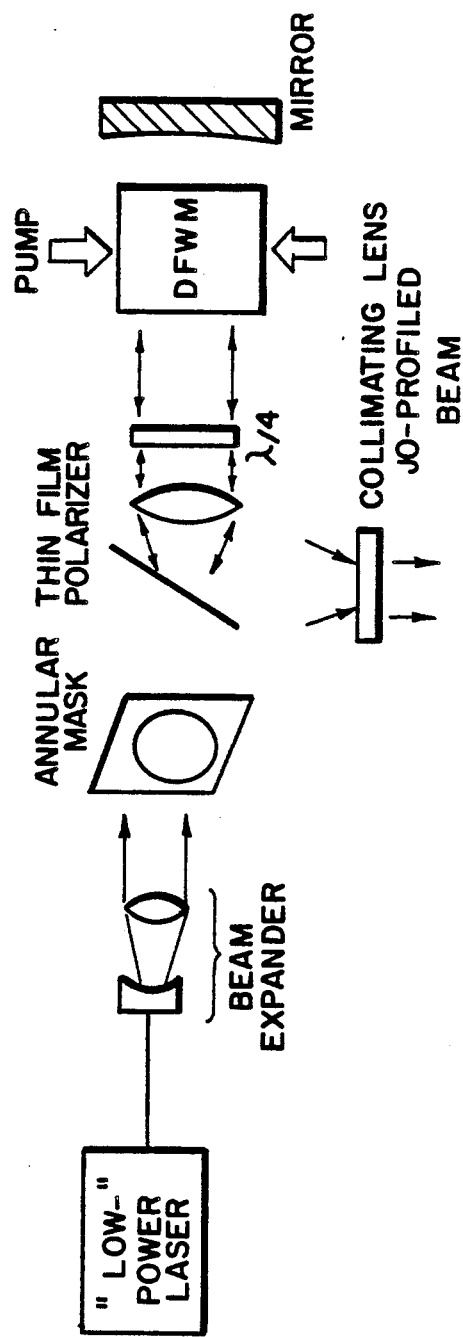
FIG. 3 shows a laser—laser resonant cavity embodiment in which only DFWM is employed.

The sequence of processes involved in the preferred embodiment occur as follows (refer to FIG. 3) the beam from a low power laser is expanded and directed onto the annular mask. Note a ring-profiler can be used here but is not indicated on the figure. The portion which passes through the mask is transmitted through a thin-film polarizer and is collimated by a Fourier-transforming lens. The collimated beam passes through a quarter wave plate and into the dfwm medium. The medium is the gain medium located in the resonant cavity of a high power laser. The result of the dfwm process is the amplified phase conjugate beam. The pc beam passes back through the quarter wave plate and the lens. It is reflected from the thin film ploarizer. The pc beam is then collimated by another Fourier-transforming lens, producing the amplified, Jo-profiled beam.

Figure 1:
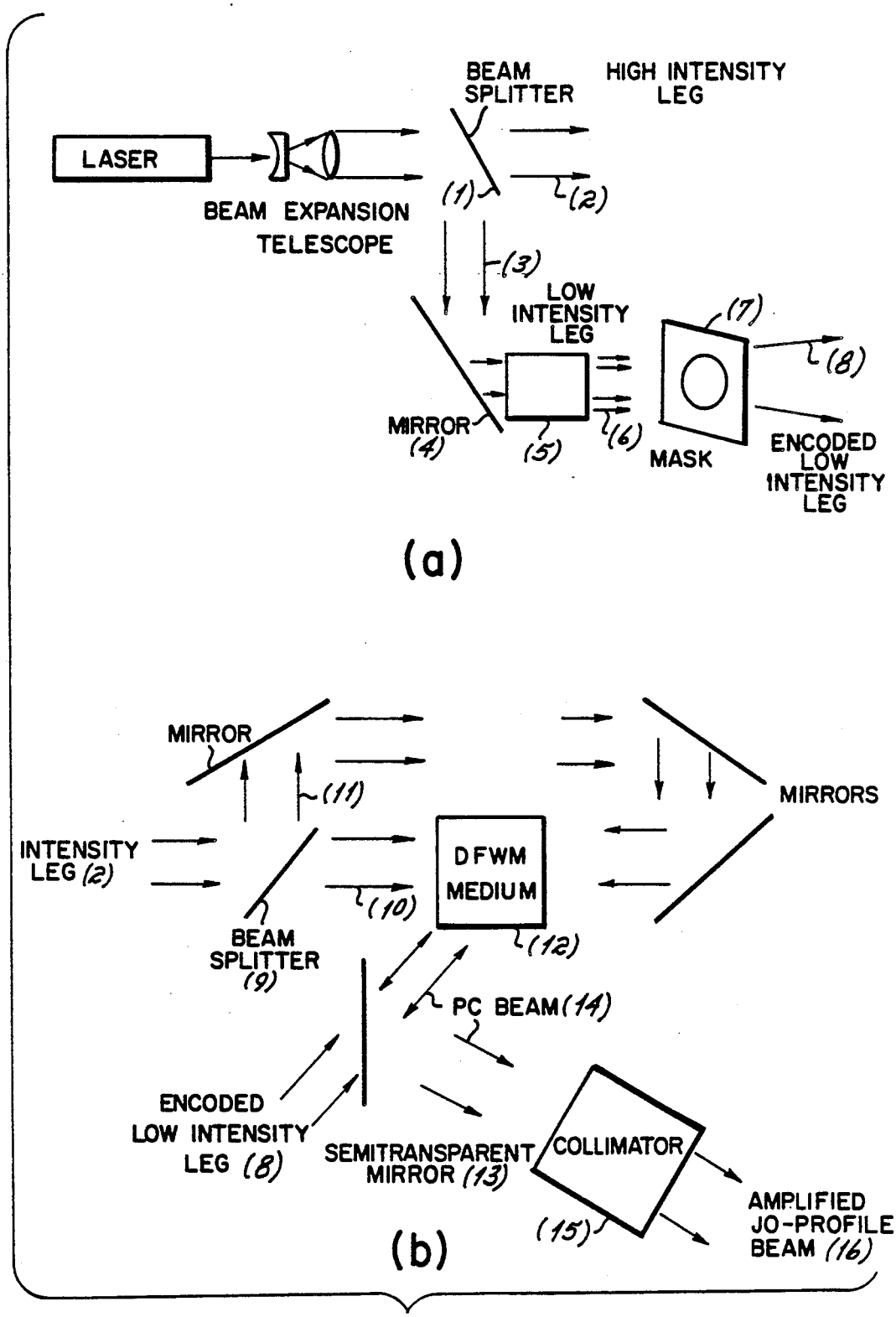
FIG. 1 shows the single laser—encoded probe embodiment of the invention. DFWM is employed.

The sequence of processes involved in a related embodiment occurs as follows: (refer to FIG. 1) the beam from the laser is expanded and then split into two components by a beam splitter (1). Said beam splitter separates the beam into a high intensity (2) and a low-intensity (3) segment. The low intensity segment enters the ring profiler (5) and is incident upon the annular mask (7) resulting in a low-intensity encoded segment (8). The high intensity segment is split into two segments, (10) and (11) which serve as the pump beams for the dfwm process. The encoded low intensity segment (8) serves as the probe beam for this process yielding an encoded pc beam (14) of much higher intensity. This segment, (14), is then collimated producing the amplified Jo-profile beam (16).

Figure 2:
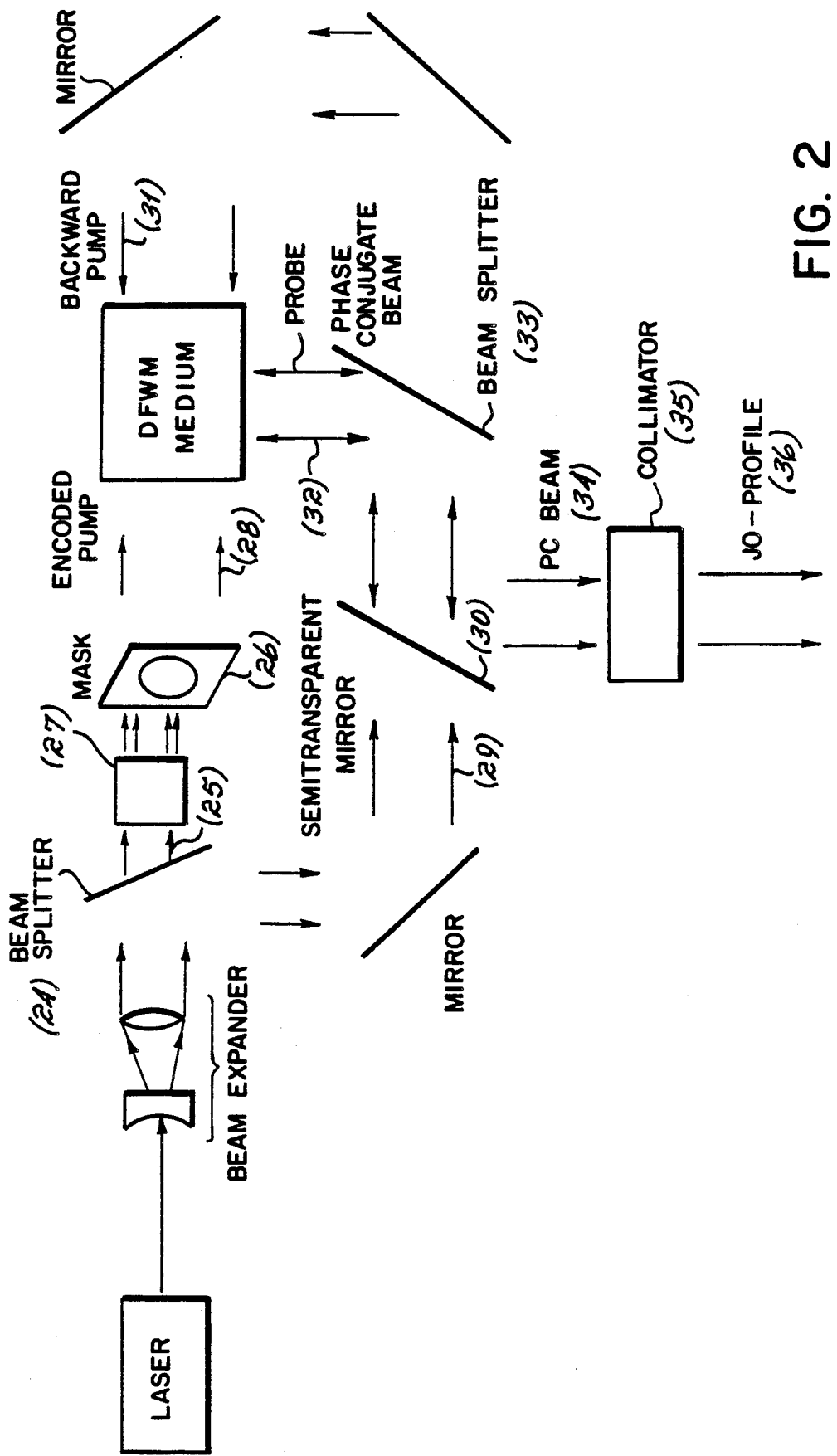
FIG. 2 shows the single laser—encoded pump embodiment of the invention. DFWM is employed.

Another alternative embodiment is depicted in FIG. 2. Here the expanded laser beam is split into a low intensity component (25) and a high intensity component (29). The low intensity segment is sent into the ring profiler (27) and onto the annular mask (26). The result is a low intensity encoded segment (28). This serves as the forward pump in the dfwm process. The backward pump (31) and the probe (32) are obtained by splitting the high intensity segment (29). In a similar fashion, the backward pump can be formed using the low-intensity encoded segment with the forward pump and probe formed from the high-intensity segment.

The dfwm process produces the amplified encoded pc beam which is diverted by the semitransparent mirror (30) into the collimator (35) producing the Jo-profiled beam (36).

Figure 4:
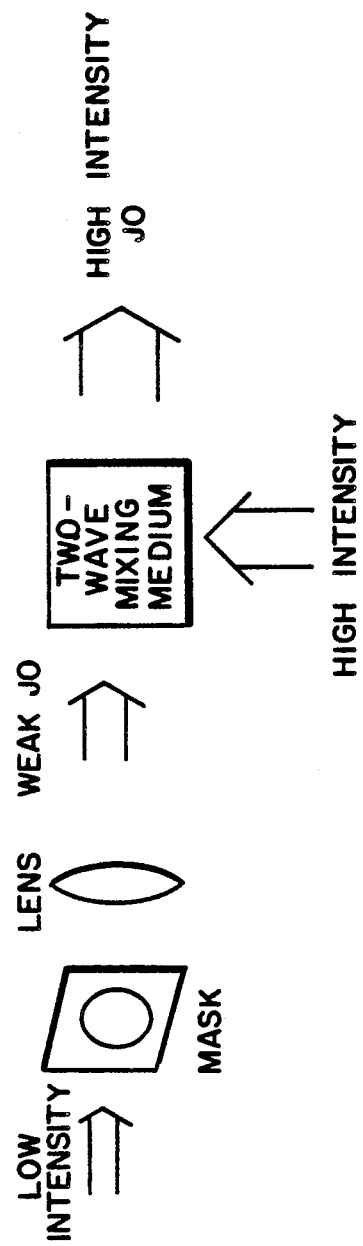
FIG. 4 shows the two laser embodiment in which twm is employed.

Finally, we mention a non-opc mechanism which will also allow an efficient coupling of laser energy into the Jo-profiled form. It involves two wave mixing in photorefractive media (see FIG. 4). In this approach the low intensity segment obtained as before by first expanding the laser beam and then using a beam splitter, is again sent into a ring profiler and then directed onto the annular mask. The result is collimated and directed into a photorefractive medium. An example of such media for visible light is barium titanate, $BaTiO_3$. The high intensity segment is also directed into the medium. The result of the coupling is an amplified, Jo-profiled beam propagating parallel to the incident low intensity segment. It is not necessary to use one laser for this embodiment: one high power and one low power laser can be employed.

Holograms generated either photographically or by a computer can also be used as a pc medium. If the diffraction efficiency of these holograms can be increased significantly, holographic phase conjugation could be effectively employed for the purpose described here.

It is to be understood that the above-described embodiments are merely illustrative of but a small number of the many possible specific embodiments which represent applications of the present invention. We do not wish to be limited to the particular non-linear optical processes described herein. Clearly, other phase conjugation processes may be devised which may be adapted for use with the present invention. In addition, numerous and various other arrangements may readily be devised in accordance with these principles by those skilled in the art without departing from the spirit and scope of the invention.

I claim:

1. Apparatus comprising:
    a laser for providing coherent light along a first optical path; optics disposed along said first optical path for first expanding and then splitting said coherent light into a higher intensity segment, directed along the first optical path, and a lower intensity segment, directed along a second optical path;
    optics disposed along said second optical path for converting the transverse intensity profile of said lower intensity segment into a ring profile;
    mask containing an annular slit and disposed along said second optical path, the inner radius of which is appropriately matched to that of the ring-profiled lower intensity segment for receiving and filtering said ring-profiled light;
    optics disposed along said first optical path for the purpose of forming forward and backward pump beams from the higher intensity segment and to focus said pump beams into the dfwm medium;
    optics disposed along said second optical path for the purpose of directing and focusing said lower intensity, ring-profiled segment into the dfwm medium and redirecting the amplified pc beam along the third optical path;
    optics disposed along said third optical path for collimating said amplified pc beam, producing the Jo-profiled beam;
    phase conjugation means disposed at termination of the first and second optical paths and at the beginning of the third optical path for substantially amplifying the encoded, lower-intensity segment at the expense of the power carried in the higher-intensity pump beams.

2. Apparatus comprising:
    a laser for providing coherent light along a first optical path, optics disposed along said first optical path for first expanding and then splitting said coherent light into a lower intensity segment, directed along the first optical path, and a higher intensity segment, directed along a second optical path;
    optics disposed along said first optical path for converting the transverse intensity profile of said lower intensity segment into a ring profile;
    mask containing an annular slit and disposed along said first optical path, the inner radius of which is appropriately matched to that of the ring-profiled lower intensity segment for receiving and filtering said ring-profiled light;
    optics disposed along said second optical path for the purpose of forming a probe beam and backward pump beam from the higher intensity segment and to focus said beams into the dfwm medium;
    optics disposed along said first optical path for the purpose of directing and focusing said lower intensity, ring-profiled segment into the dfwm medium as a forward pump beam;
    optics disposed along said second optical path for the purpose of redirecting the pc beam along the third optical path;

optics disposed along said third optical path for collimating said amplified pc beam, producing the J₀-profiled beam;

phase conjugation means disposed at termination of the first and second optical paths and at the beginning of the third optical path for encoding the probe beam with the transverse intensity profile of the forward pump beam.

3. Apparatus comprising:

oscillator means, disposed along a first optical path for providing coherent light;

optics disposed along said first optical path for first expanding then converting the transverse intensity profile of said coherent light into a ring profile:

mask containing an annular slit and disposed along said second optical path, the inner radius of which is appropriately matched to that of the ring-profiled segment for receiving and filtering said ring-profiled light;

optics disposed along the first optical path for the purpose of directing and focusing the encoded segment into a laser amplifier:

a high-power laser, minus output mirror system, disposed along the first optical path for receiving the encoded coherent light, substantially amplifying it, and phase conjugating it:

optics disposed along the first optical path in order to redirect the pc beam along a second optical path:

optics disposed along the second optical path in order to collimate the pc beam, producing the J₀-profiled beam.

4. Apparatus comprising:

a laser for providing coherent light at frequency w along the first optical path:

optics disposed along said first optical path for first expanding and then converting the transverse intensity profile of said coherent light into a ring profile:

mask containing an annular slit and disposed along said first optical path, the inner radius of which is appropriately matched to that of the ring-profiled segment for receiving and filtering said ring-profiled light:

optics disposed along said first optical path to receive said filtered beam and to direct and focus same into the twm medium;

a higher power laser for providing coherent light at frequency w along the second optical path;

optics disposed along said second optical path to receive said higher power beam and to direct and focus same into the twm medium;

optically non-linear medium (twm) disposed at the intersection of the first and second optical paths to amplify the weaker at the expense of the higher power beam;

optics disposed along the first optical path to receive the amplified beam and form the J₀-profiled beam from it.

5. Apparatus comprising:

a laser for providing coherent light along the first optical path;

optics disposed along said first optical path for first expanding and then splitting said coherent light into a lower intensity segment, directed along the first optical path, and a higher intensity segment, directed along a second optical path;

optics disposed along said first optical path for converting the transverse intensity profile of said lower intensity segment into a ring profile;

mask containing an annular slit and disposed along said first optical path, the inner radius of which is appropriately matched to that of the ring-profiled lower intensity segment for receiving and filtering said ring-profiled light;

optics disposed along said second optical path for the purpose of forming a probe beam and forward pump beam from the higher intensity segment and to focus said beams into the dfwm medium;

optics disposed along said first optical path for the purpose of directing and focusing said lower intensity, ring-profiled segment into the dfwm medium as a backward pump beam;

optics disposed along said second optical path for the purpose of re-directing the pc beam along the third optical path;

optics disposed along said third optical path for collimating said amplified pc beam, producing the J₀-profiled beam;

phase conjugation means disposed at termination of the first and second optical paths and at the beginning of the third optical path for encoding the probe beam with the transverse intensity profile of the backward pump beam.

6. Apparatus comprising:

a laser for providing coherent light along a first optical path;

optics disposed along said first optical path for first expanding and then splitting said coherent light into a lower intensity segment, directed along the first optical path, and a higher intensity segment, directed along a second optical path;

optics disposed along said first optical path for converting the transverse intensity profile of said lower intensity segment into a ring profile;

mask containing an annular slit and disposed along said first optical path, the inner radius of which is appropriately matched to that of the ring-profiled lower intensity segment for receiving and filtering said ring-profiled light;

optics disposed along said first optical path to receive said filtered lower intensity beam and to direct and focus said beam into the two medium;

optics disposed along said second optical path to receive said higher power beam and to direct and focus said beam into the twm medium;

optically non-linear medium (twm) disposed at the intersection of the first and second optical paths to amplify said lower power beam at the expense of said higher power beam;

optics disposed along the first optical path to receive the amplified beam and for the J₀-profiled beam from it.

* * * * *

UNITED STATES PATENT AND TRADEMARK OFFICE
CERTIFICATE OF CORRECTION

PATENT NO. : 4,992,750
DATED : February 12, 1991
INVENTOR(S) : Bob W. Stewart

It is certified that error appears in the above-identified patent and that said Letters Patent is hereby corrected as shown below:

On title page, item [54] and col. 1, line 4, after "DIFFRACTION" insert

--FREE TRANSMISSION IN FREE SPACE--.

Column 6, line 51, "two" should be --twm--.

Signed and Sealed this

Sixteenth Day of November, 1993

Attest:

BRUCE LEHMAN

Attesting Officer

Commissioner of Patents and Trademarks